July 13, 1943.  C. A. FINLEYSON  2,324,376
PEANUT HARVESTER PLOW
Filed March 19, 1942
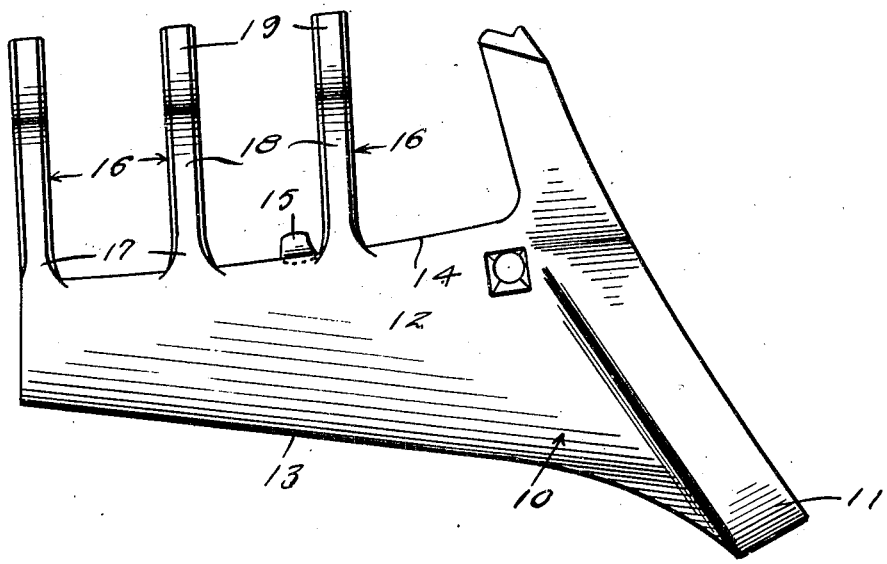
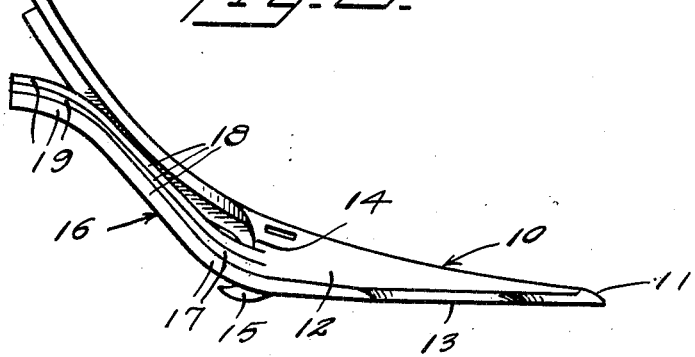
Inventor
C. A. Finleyson
By L. F. Randolph
Attorney Patented July 13, 1943

2,324,376

UNITED STATES PATENT OFFICE 2,324,376

PEANUT HARVESTER PLOW

Charles A. Finleyson, Rochelle, Ga.

Application March 19, 1942, Serial No. 435,405

1 Claim. (Cl. 55—54)

This invention relates to an improved plow for use in harvesting peanuts and more particularly to an improved construction of plowshare having fingers for lifting the vines out of the ground so that the vines will be left lying on the surface by the plow in which position they can be readily engaged by a rake so that a number of rows of peanut vines can be readily raked together preparatory to being stacked.

The conventional practice in harvesting peanuts is to manually pull the vines out of the ground after they have been plowed due to the fact that the plow will pass under the roots which are three to five inches below the surface and not raise the vines above the surface. Consequently, it is not possible to rake up the vines after the plowing operation.

The principal aim of this invention is to materially reduce the time and manual labor required in harvesting peanuts by providing a plowshare which will produce a very flat furrow and which will leave the ground substantially level to permit the vines to be readily raked up after being lifted from the earth, said share being constructed so that it will pass under the roots of the peanut vines to cut the roots loose, after which the vines will pass over the fingers being thereby raised out of the ground. The forward, sharpened edge of the blade portion of the share will cut the vines and roots loose from the ground when thus raised by the fingers so that the vines will be left lying on the surface after the plowshare has passed therebeneath.

Other objects and advantages of the invention will hereinafter become more fully apparent from the following description of the drawing which illustrates a preferred embodiment thereof, and wherein:

Figure 1 is a plan view of the peanut harvesting plowshare, and

Figure 2 is an end view in elevation of the same looking toward the left hand end of Figure 1.

Referring more particularly to the drawing, wherein like reference characters designate like or corresponding parts throughout the different views, 10 designates generally a plowshare of conventional construction having a point 11 and a blade portion 12 which extends from one side of the point 11 and which is provided with a sharpened forward edge 13 which is inclined away from the point 11. A back edge 14 of the blade 12 is provided with a depending supporting foot 15. As seen in Figure 2, the blade portion 12 is substantially flat and in its normal operative position is disposed in substantially a horizontal plane.

The invention comprises a plurality of lifting fingers 16, preferably three in number, and which are formed integral with or suitably connected to the back edge 14 and which are spaced a substantial distance apart. The fingers 16 are relatively long and narrow and adjacent their forward or connected ends, said fingers 16 are curved upwardly from the rear edge 14 which curve is provided by forward, longitudinally curved portions 17 thereof. Intermediate portions 18 of the fingers 16 are substantially straight and the opposite ends 19, which constitute the upper, rear ends of the fingers 16, are curved in the opposite direction to the forward, lower ends 17 so that the rear ends 19 are curved rearwardly.

From the foregoing it will be readily apparent that the share 10, when in operation, will readily pass under the roots of peanut vines, not shown, so that vines will be engaged and lifted by the fingers 16 and as the fingers 16 will be above the surface of the ground, the vines will be lifted thereby completely out of the ground and left lying on the surface thereof. The vines by being thus raised will be positioned so that the point 11 and the edge 13 can cut the roots loose from the ground to enable the vines to be readily raked up after being plowed. The share 10 is substantially flat so that it will produce a substantially flat furrow thus leaving the earth substantially level so that the vines can be readily raked up after being lifted out of the ground.

Various modifications and changes are contemplated and may obviously be resorted to, provided they fall within the spirit and scope of the invention as hereinafter defined by the appended claim, as only a preferred embodiment of the invention has been disclosed.

I claim as my invention:

A plowshare for use in harvesting peanuts, the share having a substantially horizontally disposed blade portion, said blade portion at the point side having an upper concave rearwardly extending surface higher than the remainder of the upper surface of the blade portion, a plurality of separated fingers connected to and projecting upwardly and rearwardly along reverse curves from the rear of said blade portion, and a foot in spaced relation to the point side depending from the rear of said blade portion.

CHARLES A. FINLEYSON.